3,260,132
Patented July 12, 1966

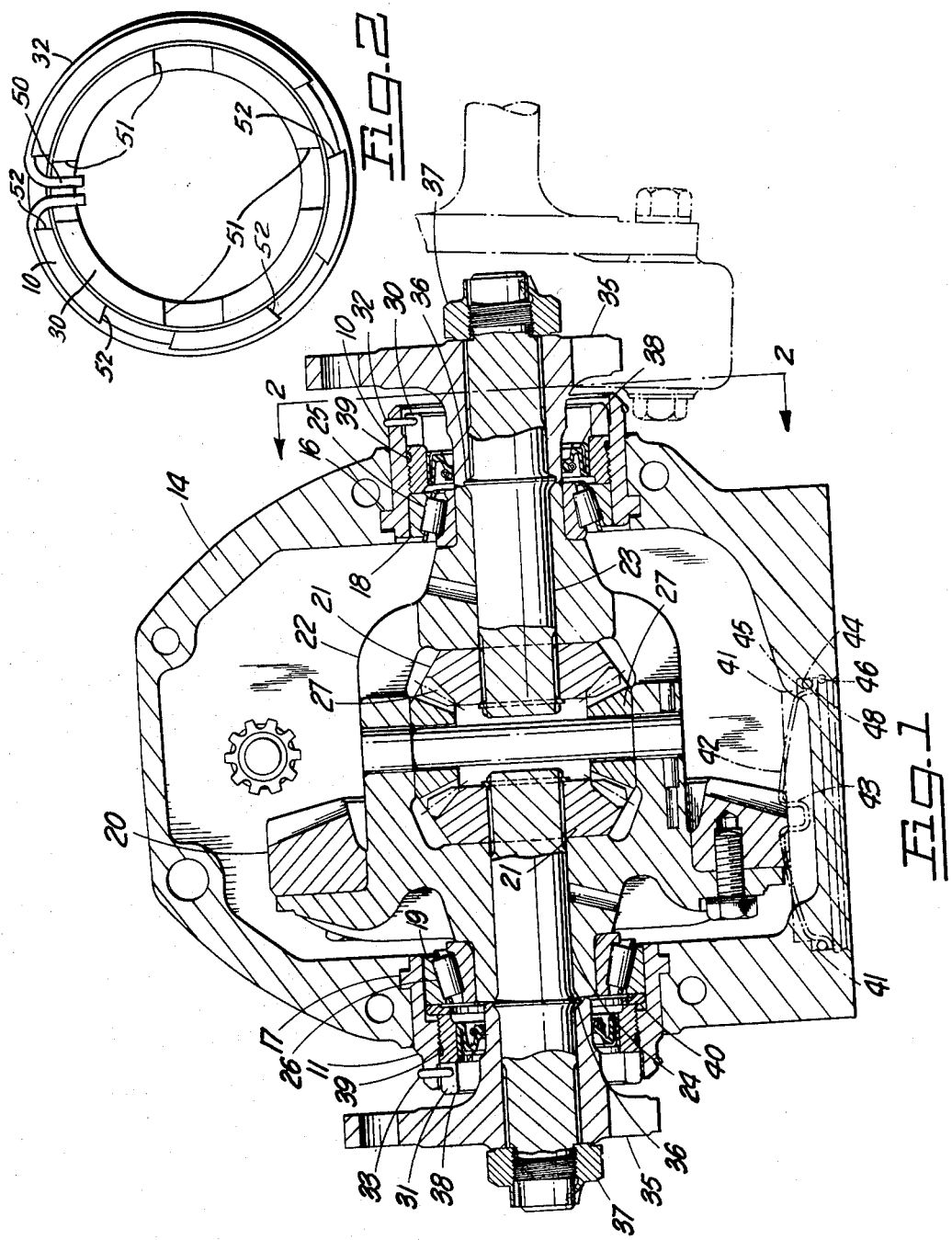

3,260,132
DIFFERENTIAL GEAR MECHANISMS
Adrian William West and John Lewis, Coventry, England, assignors to Humber Limited, Coventry, England, a British company
Filed June 4, 1964, Ser. No. 372,540
2 Claims. (Cl. 74—609)

The invention relates to differential gear mechanisms for motor vehicles of the kind comprising a casing and a planet wheel carrier mounted for rotation within the casing in separate or combined journal and thrust bearings in alignment at opposite ends of the casing, the thrust bearings acting in opposition to locate the carrier axially.

The invention provides a differential gear mechanism for a motor vehicle of the kind described in which the casing is composed of two separate parts fixed together, the two parts each providing a part of the housing for each thrust bearing, there are two axially aligned sleeves clamped in position within the housings between the parts of the casing, the sleeves each having internally a smooth cylindrical portion and the thrust bearings are axially slidable within the cylindrical portions to adjust the axial position of the carrier and/or the initial load on the bearings, by screwed rings or sleeves surrounding the axis of rotation making screw-threaded engagement with the interior of the sleeves and thrusting directly or indirectly against the outer ends of the bearings.

The mechanism may include two, aligned, half-shafts rotatable within the carrier and projecting through the two bearings respectively. The shafts may carry at their adjacent ends crown bevel gears which mate with one or more planet wheels on the carrier.

The sleeves may be located axially in the housings by means of radially extending flanges on the sleeves which engage in grooves in the housings.

Preferably the carrier is directly supported on the bearings aforesaid and the shafts are rotatably supported in bearings on the carrier.

In one construction of the mechanism the housing is split diametrically of the bearings.

The bearings may be of the taper roller kind, the outer races being slidable in the sleeves.

For the purpose of locking the screwed rings on the sleeves, there may be around one of these parts of each bearing a ring of notches or holes and a spring clip around the housing with one inwardly directed leg which engages in one of the notches or holes and a second leg which engages in a notch or hole in the other of the parts.

There may be an inspection port in the casing and a cover therefor which is held within the port aperture, between a step or flange on the casing and a spring ring or circlip.

A specific example of a differential mechanism according to the invention will now be described by way of example with reference to the accompanying drawings in which:

FIGURE 1 shows an end elevation of the mechanism, in section, along the line on which the casing is split for constructional purposes, and FIGURE 2 is a view of the sleeve and the inner sleeve taken along the line 2—2 in FIGURE 1 and looking in the direction of the arrows.

The mechanism comprises a casing 14, which is constructed in two parts which meet in the plane of the drawing, a combined crown wheel and planet wheel carrier 20, 22, planet wheels 27 within the carrier and two half-shafts 23, 24 supported for rotation within the carrier and each carrying at one end a bevel gear 21 mating with the planet wheels and at the other end a flange 35 forming a driving member of a universal coupling.

The two parts of the casing form housings for sleeves 10, 11 which are clamped between the two parts of the casing when the two parts are bolted together, and are located axially by upstanding flanges 16, 17 integral with the sleeves and located in grooves in the casing.

Outer races 18, 19 of the taper roller thrust and journal bearings are a very close sliding fit in the outer screwed sleeves when these sleeves are in their clamped condition. These bearings support the planet carrier for rotation and also locate the carrier axially.

In the assembly of the mechanism and after the crown wheel 20, differential gear train 21, carrier 22, half-shafts 23, 24 roller bearings 25, 26 and sleeves have been assembled in the casing, the sleeves are pulled axially outwards to ensure that the flanges 16, 17 seat against the outer faces of their grooves in the casing, the two parts are bolted together, and screwed rings 30, 31 inserted into the housings. These screwed rings are tightened against the outer races of the bearings 25, 26 to give the correct preload or "nip" which also expands the outer races against the sleeves 10, 11 thus resisting any tendency for the outer races to revolve.

If now both the rings 30, 31 are moved in unison, the crown wheel 20 can be adjusted for correct mesh with its pinion (not shown), this adjustment being held by spring clips 32, 33 with inwardly directed legs 50 which engage slots 51 in the inner sleeves 30 and slots 52 in the sleeves 10. There are four slots in each ring, spaced in quadrature, and either two or four slots in the sleeve, in the former case being spaced at 0° and 225°, and in the latter case at 0°, 157½°, 225° and 292½°. This arrangement coupled with a fine thread allows a very fine adjustment.

The drive flanges 35 carrying oil seals 38 are secured against shoulders 36 on the half shafts by nuts 37. Oil seals 39 are also fitted between the rings and the sleeves.

When one taper bearing requires to be bigger than the other, as shown in the drawing, the sleeve is modified to accommodate the bearing, and a distance piece 40 to transfer thrust to the bearing outer race is employed. The screwed ring, oil seals, and spring locking clip all remain the same.

An inspection hole 41 is provided for checking back lash and tooth contact, and the cover 42 for this hole is a flush and sunken cap, made from a pressing, and having a rim 48 treated by a step in the wall of the hole. A sealing ring 44 is compressed between a wall 45 on the cover and the side wall of the hole 41 and the cover is held in place by a spring ring or circlip 46. The cover has a transverse rib 43 which forms a handle to assist in removal of the cover.

We claim:
1. A differential gear mechanism having
   (a) a casing composed of two separate parts,
   (b) said casing being formed with two axially aligned housings, the two parts of the casing each providing a part of each housing,
   (c) two axially aligned sleeves within the housings respectively,
   (d) means to fix the two parts of the casing together with the sleeves clamped in the housings,
   (e) each sleeve having internally a smooth cyindrical portion and a threaded portion,
   (f) combined journal and thrust bearings axially slidable within the cylindrical portions,
   (g) the housing being split diametrically of the bearings,
   (h) a planet wheel carrier journalled in the bearings which thrust in opposition to locate the carrier axially, and
   (i) screw-threaded members making screw-threaded engagement with the threaded portions within the sleeves and thrusting against the bearings whereby to adjust the axial position of the bearings and the carrier.

2. A differential gear mechanism as claimed in claim 1 in which, to lock the screw-threaded members in the sleeves there is around one of these parts of each bearing a ring of notches, and in the other of these parts of each bearing at least one notch and a spring clip around the housing with at least one inwardly directed leg which engages in one of the notches of the ring and also with a notch in the other of the parts.

References Cited by the Examiner

UNITED STATES PATENTS 2,548,258 4/1951 Griffith _____ 74—713
2,609,710 9/1952 Osborn _____ 74—713

FRANK SUSKO, *Primary Examiner.*
DON A. WAITE, *Examiner.*
J. A. WONG, *Assistant Examiner.*